United States Patent [19]

Yamamoto et al.

[11] Patent Number: 4,649,013
[45] Date of Patent: Mar. 10, 1987

[54] METHOD OF MAKING A PLASTIC CAP

[75] Inventors: Osamu Yamamoto, Hiratsuka; Muneki Yamada, Fujisawa, both of Japan

[73] Assignee: Toyo Seikan Kaisha, Limited, Osaka, Japan

[21] Appl. No.: 469,249

[22] Filed: Feb. 24, 1983

[30] Foreign Application Priority Data

Jul. 8, 1982 [JP] Japan .................. 57-117727

[51] Int. Cl.⁴ ............................... B29D 1/00
[52] U.S. Cl. .................... 264/318; 264/322; 425/DIG. 58
[58] Field of Search .............. 264/318, 322; 425/58

[56] References Cited

U.S. PATENT DOCUMENTS

| 4,196,818 | 4/1980 | Brownbill | 215/252 |
| 4,354,996 | 10/1982 | Nishiyama et al. | 264/322 |

FOREIGN PATENT DOCUMENTS

| 54-83588 | 7/1979 | Japan . |
| 56-24110 | 3/1981 | Japan . |
| 56-74445 | 6/1981 | Japan . |
| 58-30949 | 2/1983 | Japan . |
| 80/01142 | 4/1981 | PCT Int'l Appl. . |
| 2102776A | 2/1983 | United Kingdom . |

Primary Examiner—James Derrington
Attorney, Agent, or Firm—Armstrong, Nikaido, Marmelstein & Kubovcik

[57] ABSTRACT

A plastic cap is made by introducing an upper plunger formed with a thread groove and a lower plunger into the cavity of a die, while compressing a molten plastic stock between the upper and lower plungers, with the upper plunger sliding along the inner peripheral surface of a holding pad which is held in contact with the upper surface of the die, whereby the skirt portion of the cap is formed by the material of the plastic stock flowing out from between the first and second plungers into between the first plunger and the inner peripheral surface of the die cavity.

13 Claims, 22 Drawing Figures

F I G. 3
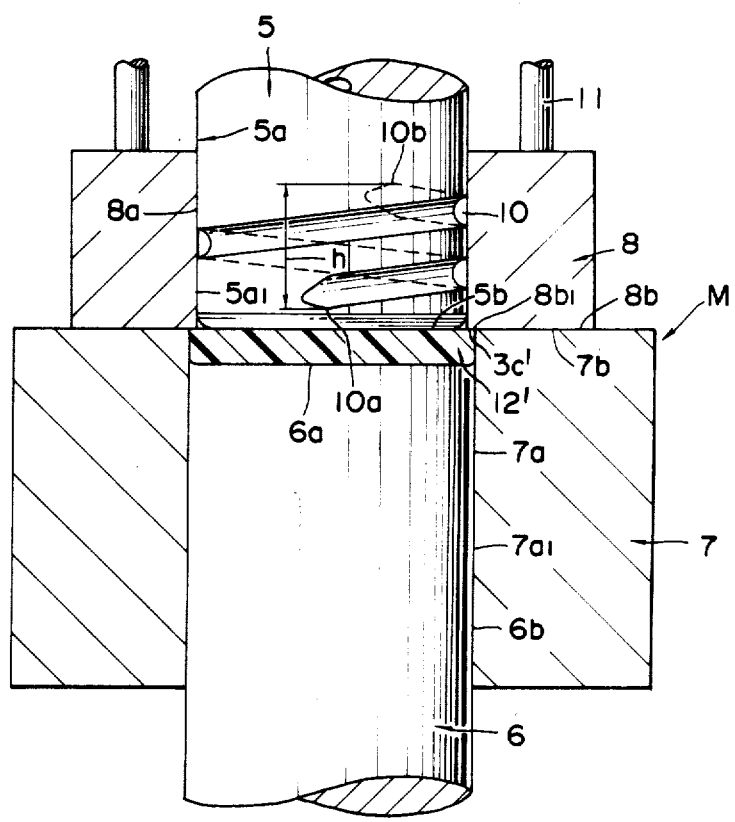

F I G. 15
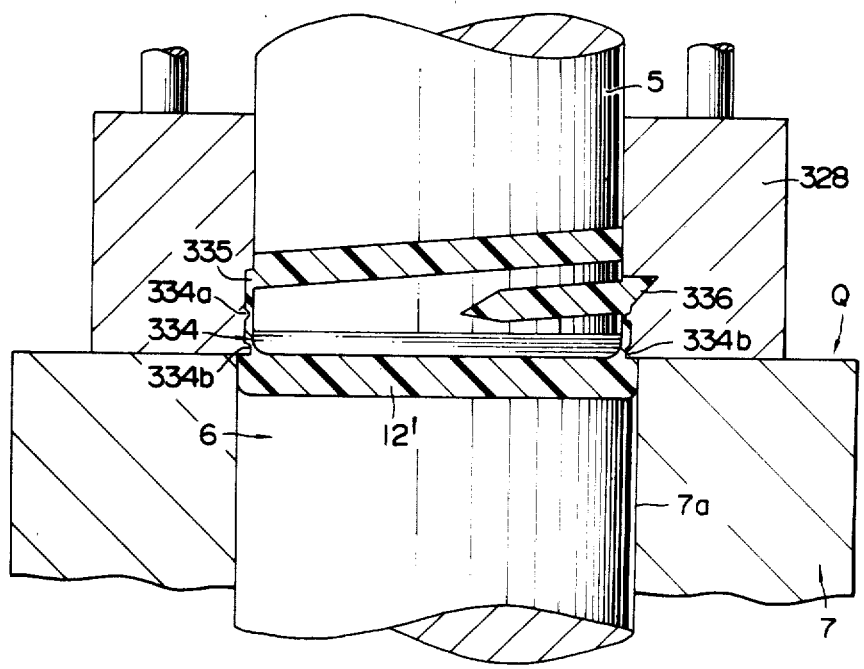

: 1

METHOD OF MAKING A PLASTIC CAP

BACKGROUND OF THE INVENTION

The present invention relates to a method of making a plastic cap, and more particularly to a method of manufacturing, by means of compression molding, a plastic cap with a threaded inner surface employed for hermetically sealing the mouth of a container such as a bottle.

A typical conventional plastic cap, i.e., a plastic cap with a threaded inner surface employed for hermetically sealing the mouth of a container such as a bottle made of glass, plastic or metal is manufactured by mainly injection molding. The injection molding is a method wherein a molten plastic is injected from a nozzle into a mold to form a molded article with a predetermined shape. Since the method requires the material to have an excellent fluidity, it is general to employ a relatively low-strength plastic having a relatively low molecular weight and a melt flow index of about 10-20 g/10 min.

Accordingly, in order to ensure a required cap strength, it is necessary to make the top end and skirt portion of the cap have a relatively large wall thickness, which unfavorably results in a higher material cost.

Moreover, as a plastic stock, it is preferable from the viewpoint of colt to select a material from polyolefins, e.g., polyethylene or polypropylene. However, caps made of these olefin resins by means of injection molding are susceptible to stress-crack, and are poor in low-temperature impact strength. Further, since this type of caps are also poor in the barrier properties to $O_2$ and $CO_2$, products contained in the bottles hermetically sealed by the caps are inconveniently apt to change properties thereof.

On the other hand, a method of manufacturing plastic caps by means of compression molding has recently been proposed in Japanese Patent Laid-Open No. 501121/1981 (PCT/US80/01142) or the like. The method is such that a molten plastic stock is loaded in a cavity with a shape corresponding to the outer shape of a cap to be formed and then a plunger having in its side surface a groove with a shape corresponding to that of a thread to be formed in the inner surface of the cap is forced into the cavity to compression-mold a cap with a threaded inner surface.

In this method, however, since the end of the skirt portion of the cap is formed in the last stage, in order to ensure an accurate profile of the end portion, it is necessary to employ a plastic excellent in fluidity, i.e., relatively high in melt flow index (although not so high as is in the injection molding).

In addition, this method unfavorably requires a comparatively high molding pressure. Particularly, in case of manufacturing a cap having a pilfer-proof band connecting with the skirt portion through narrow bridges, the flow of a resin is apt to clog (owing to setting) at the bridges. Consequently, a molding fault, such as a missing portion, is easily produced at the pilfer-proof band, and moreover, it is inconveniently difficult to form a pilfer-proof band with a complicated shape. Particularly, in case where the skirt portion is high, these shortcomings tend to occur remarkably.

In addition, since the cavity is deep, it is often that when the molten plastic stock is loaded in the cavity by dropping, the plastic stock is caught by the sidewall of the cavity, resulting in an unsatisfactory compression molding. Moreover, since the amount of air to be removed in the cavity is large, it is inconveniently necessary to employ a special means for removal of the air.

SUMMARY OF THE INVENTION

It is, therefore, an object of the invention to provide a method of manufacturing a plastic cap having a skirt portion whose end portion has an accurate profile, even when a molten plastic stock with a relatively low melt flow index and of a relatively low temperature is used.

It is another object of the invention to provide a method of manufacturing a pilfer-proof plastic cap having a satisfactory pilfer-proof band with no missing portion and sound bridges, even when a molten plastic stock with relatively low melt flow index and of a relatively low temperature is used, and the pilfer-proof band has a complicate configuration.

According to one aspect of the invention, there is provided a method of manufacturing a plastic cap with a top end and a skirt portion hanging down from the peripheral edge of the top end, the skirt portion being provided with a thread formed on the inner surface thereof, comprising: preparing a first plunger whose lower side surface portion has a shape corresponding to the inner surface of the skirt portion and is formed with a thread groove with a shape corresponding to that of the thread and whose bottom end surface has a shape corresponding to that of the inner surface of the top end, a second plunger whose upper end surface has a shape corresponding to that of the outer surface of the top end, a holding pad with an inner peripheral surface with a height larger than that of the thread groove as well as an inside diameter substantially equal to the outside diameter of the first plunger, and a die provided with a die cavity having an inner peripheral surface with a shape corresponding to that of the outer peripheral surface of the skirt portion; bringing the holding pad into contact with the upper surface of the die; placing a molten plastic stock onto the upper end surface of the second plunger; and introducing the first and second plungers into the die cavity with the first plunger sliding along the inner peripheral surface of the holding pad while compressing the molten plastic stock between the first and second plungers, whereby the skirt portion is formed by the material of the plastic stock flowing out from between the first and second plungers into between the lower side surface portion of the first plunger and the inner peripheral surface of the die cavity.

According to the another aspect of the invention there is provided a method of manufacturing a plastic cap having a top end, a skirt portion hanging down from the peripheral edge of the top end, and a pilfer-proof band having a shape of a short cylinder, the skirt portion being provided with a thread formed on the inner surface thereof, and the pilfer-proof band being connected to the end surface of the skirt portion through a plurality of narrow bridges, comprising: preparing a first plunger whose lower side surface portion has a shape corresponding to the inner surface of the skirt portion and is formed with a thread groove with a shape corresponding to that of the thread and whose bottom end surface has a shape corresponding to that of the inner surface of the top end, a second plunger whose upper end surface has a shape corresponding to that of the outer surface of the top end, a holding pad with an inner peripheral surface with a height larger than that of the thread groove, the upper portion of the inner peripheral portion having an inside diameter substantially equal to the outside diameter of the first plunger, and the lower portion of the inner peripheral portion being formed with a plurality of linear grooves having a shape corresponding to the bridges on the lower end thereof, and an annular groove connecting to the linear grooves and having a shape corresponding to said pilfer-proof band, and a die provided with a die cavity having an inner peripheral surface with a shape corresponding to that of the outer peripheral surface of the skirt portion; bringing the holding pad into contact with the upper surface of the die; placing a molten plastic stock onto the upper end surface of the second plunger disposed in proximity of the level of the bottom end surface of the holding pad; compressing the molten plastic stock between said first and second plungers to form the pilfer-proof band and the bridges between the first plunger and the holding pad; and then introducing the first and second plungers into the die cavity with the first plunger sliding along the upper portion of the inner peripheral surface of the holding pad while compressing the molten plastic stock between the first and second plungers, whereby the skirt portion is formed by the material of the plastic stock flowing out from between the first and second plungers into between the lower side surface portion of the first plunger and the inner peripheral surface of the die cavity.

The above and other objects, features and advantages of the invention will be apparent from the following description when the same is read in conjunction with the accompanying drawings.

BRIEF DESCRIPTION OF THE DRAWINGS

FIGS. 2 through 6 are sectional side elevations illustrating examples of processes of manufacturing the cap shown in FIG. 1, respectively, FIG. 2 illustrating the state where a plastic stock is loaded, FIG. 3 illustrating a state just before molding, FIG. 4 illustrating a state during the molding, FIG. 5 illustrating a state after completion of the molding, FIG. 6 illustrating a state just before the cap is removed from an upper plunger;

FIGS. 15 and 16 are sectional side elevations illustrating a state at the early stage of forming the cap shown in FIG. 12, and a state just after the completion of formation of the cap shown in FIG. 12 respectively;

DESCRIPTION OF THE PREFERRED EMBODIMENT

Figure 1:
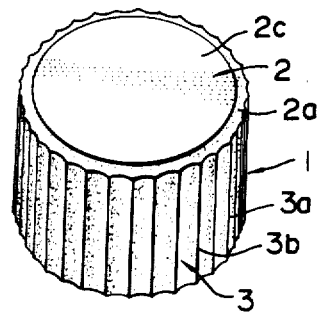
FIG. 1 is a perspective view of a first example of caps manufactured by the method of the invention.

Referring to FIG. 1 showing an example of plastic caps (referred to as simply "cap" hereinafter) manufactured by the method of the invention, a cap 1 has a top end 2 and a skirt portion 3 hanging down from a peripheral edge 2a of the top end 2. The skirt portion 3 has a thread (see a reference numeral 4 in FIG. 6) formed on its inner surface as well as an axially extending knurl 3b formed on its outer peripheral surface 3a for preventing slippage in hermetical sealing or opening.

FIGS. 2 through 6 show examples of processes and a molding apparatus M for manufacturing the cap 1 of the type mentioned above.

The molding apparatus M has an upper plunger 5, a lower plunger 6, a die 7 and a holding pad 8. The upper plunger 5 has a lower side surface portion $5a_1$ with a shape corresponding to that of the inner peripheral surface of the skirt portion 3 of the cap 1, and the lower side surface portion $5a_1$ has a thread groove 10 with a shape corresponding to that of the thread 4 of the cap 1. Moreover, the bottom end surface 5b of the upper plunger 5 has a shape corresponding to that of the inner surface 2b (see FIG. 6) of the top end 2 of the cap 1.

The lower plunger 6 has an upper end surface 6a with a shape corresponding to that of the outer surface 2c of the top end 2 of the cap 1 and a side peripheral surface 6b with a shape corresponding to that of the outer peripheral surface 3a of the skirt portion 3, and is adapted to be slidable in a cavity 7a of the die 7 having an inner peripheral surface $7a_1$ with a shape corresponding to also that of the outer peripheral surface 3a of the skirt portion 3. It is to be noted that the die 7 is held in place by means of a holding device, not shown.

The holding pad 8 is a ring-shaped body having an inner peripheral surface 8a slidable along the side peripheral surface 5a of the upper plunger 5. The inside diameter of the inner peripheral surface 8a is equal to the inside diameter of the end surface 3c (see FIG. 6) of the skirt portion 3. On the other hand, the height of the inner peripheral surface 8a is set so as to be larger than the height of the thread groove 10, i.e., the height h (see FIG. 3) between the lowest point 10a and the highest point 10b thereof. This is for preventing a plastic stock rising through the thread groove 10 from escaping to the outside in compression molding, explained later. It is to be noted that the holding pad 8 is adapted to be vertically movable at a predetermined timing by means of a drive mechanism, not shown, through vertical rods 11.

Figure 2:
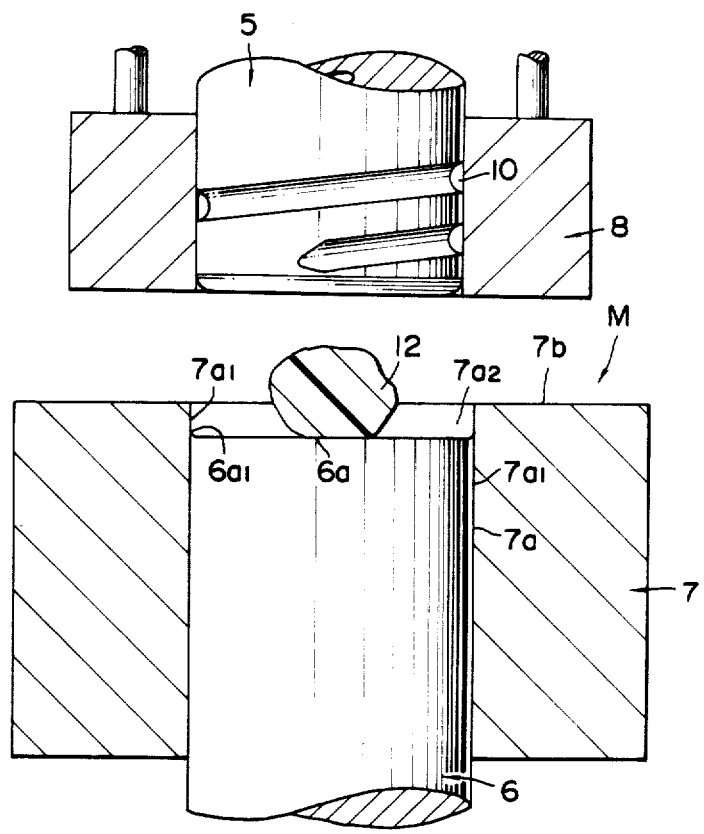

In the above molding apparatus M, as shown in FIG. 2, first, the upper plunger 5 and the holding pad 8 are raised, and the lower plunger 6 is raised in the die cavity 7a until the upper end surface 6a reaches a position having a predetermined depth from the upper surface 7b of the die 7. Under this state, a molten plastic stock 12 (the weight thereof is substantially equal to the weight of the cap 1 to be formed) is dropped onto the upper end surface $6a$ so as to be loaded. The above-mentioned predetermined depth is usually set so that the volume of a die cavity gap portion $7a_2$ defined by the levels of the upper end surface $6a$ and the die upper surface $7b$ is substantially equal to the volume of the plastic stock 12. However, the depth may be set such that the level of the side end $6a_1$ of the upper end surface $6a$ substantially coincides with that of the die upper surface $7b$, as described later.

Accordingly, since the die cavity gap portion $7a_2$ is shallow in case of the loading of the plastic stock 12, the loading is smoothly effected without causing such a trouble that the plastic stock 12 is caught by the inner peripheral surface $7a_1$ of the die cavity when being loaded.

Then, the holding pad 8 is lowered in order to bring the lower surface $8b$ into contact with the die upper surface $7b$. With the lower plunger 6 sustained, the upper plunger 5 is lowered to crush the plastic stock 12 into a disc body $12'$ filling the die cavity gap portion $7a_2$, as shown in FIG. 3. In this case, since the plastic stock 12 is still practically hot, the shape of a portion $3c'$ thereof corresponding to the end surface $3c$ of the skirt portion of the cap to be formed is accurately defined by a portion $8b_1$ of the holding pad bottom surface $8b$ projecting above the die cavity $7a$. Accordingly, it is possible to obtain an accurate shape of the end surface $3c$ even if the plastic stock 12 is constituted by a plastic with a relatively low melt flow index and has a comparatively low temperature, slightly higher than its melting point.

As the plastic constituting the plastic stock 12, it is possible to employ any desired one of thermoplastics, e.g., polyolefins such as low-density polyethylene, medium-density polyethylene, high-density polyethylene, linear low-density polyethylene or isotactic polypropylene, acrylic resins, nitrile resins, saturated polyester resins, or their copolymers or blends. However, from the viewpoint of cost, a polyethylene or polypropylene with a relatively low melt flow index (e.g., about 0.3–10g/10 min.) is particularly preferable. In this case, such fillers are generally added to the plastic as a coloring material, lubricant, antistatic agent and anti-oxidizing agent.

The plastic stock 12 is constituted by a single body of one of these thermoplastics, or a laminate or blend formed by laminating or blending, with one of these thermoplastics employed as a main body, a resin with barrier properties to $O_2$ and $CO_2$, e.g., ethylene-vinyl alcohol copolymer, polyamide, polyvinylidene chloride or polyvinyl alcohol and the like.

In case of a laminate, it is preferable to employ a five-layer laminate comprising A - B - C - B - A, having gas barrier properties to water vapor, $O_2$ and $CO_2$ as well as a proper strength, in which: A is a high-density or linear low-density polyethylene or polypropylene, B is an acid-modified polyolefin of the selected A (functioning as a bonding agent), and C is an ethylene-vinyl alcohol copolymer or polyamide or polyvinylidene chloride.

The plastic stock 12 constituted by a plastic single body or blend is generally formed by cutting a melt extruded body. In case of a plastic stock constituted by a laminate, a stock which is previously formed by cutting a sheet-like laminate into the shape of the disc body $12'$ shown in FIG. 3 may be placed in a pan having a recess (preferably having an inner surface coated with a fluorocarbon resin) with a shape corresponding to that of the stock and heated to a predetermined temperature in an oven or the like. Then, the heated plastic stock is loaded in the die cavity gap portion $7a_2$, and molding is started from the state shown in FIG. 3.

Figure 19:
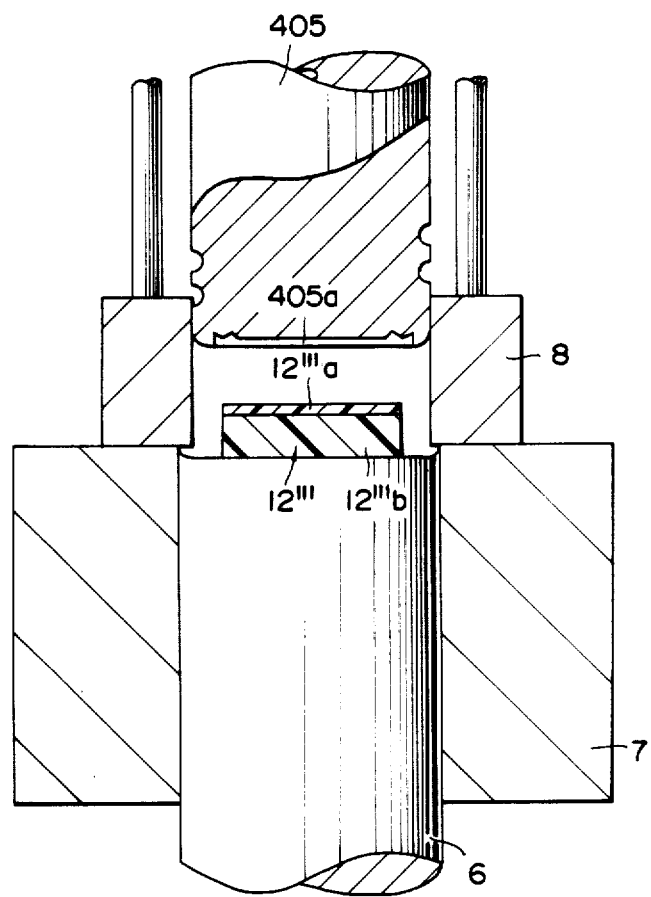
FIGS. 19, 20 and 21 are sectional side elevations illustrating a state just before a cap having a liner layer is integrally formed, a state at the early stage of forming the cap, and a state just after the completion of formation of the cap, respectively.
Figure 20:
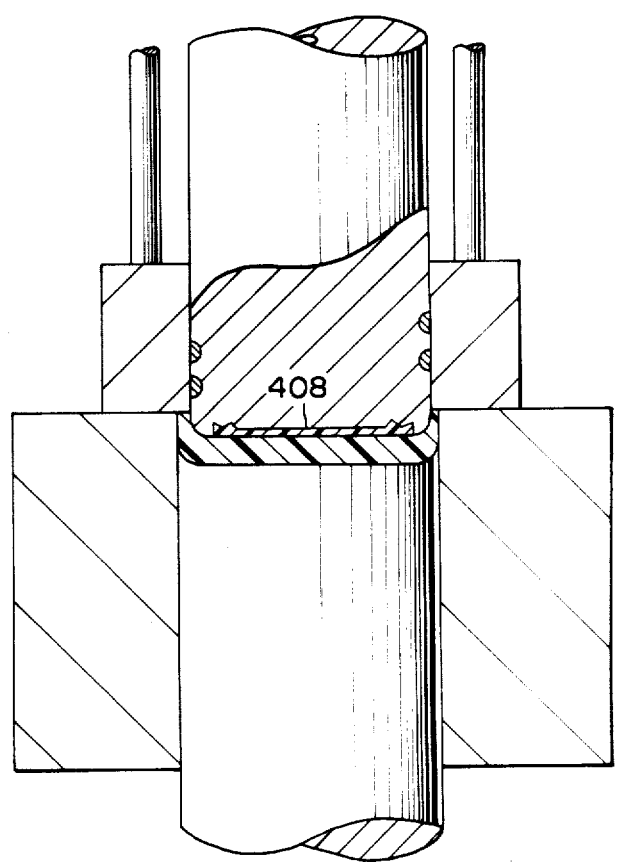
Figure 21:
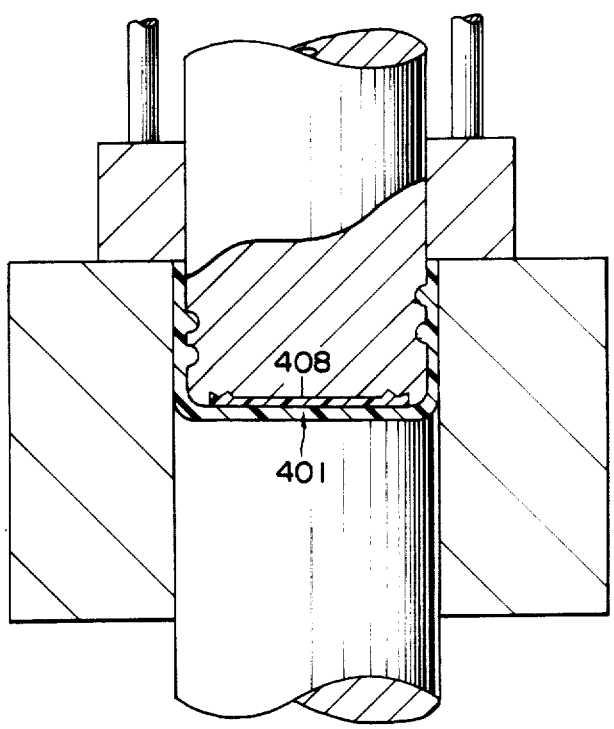

By using a disc body $12'$ formed from a laminate consisting essentially of an upper layer of a relatively soft plastic facing the upper plunger 5 and a lower layer of a relatively hard plastic facing the lower plunger 6, a cap having a liner layer of the above relatively soft plastic as a sealing member may be made in accordance with this invention, as indicated in FIGS. 19, 20 and 21.

The temperature of the material of the plastic stock 12 during molding is maintained at a temperature above the melting point of the plastic concerned (in case of a crystalline plastic) or the liquid-state flow starting point thereof (in case of an amorphous plastic). This is for the purpose of ensuring the adhesion between the thread 4 to be formed and the skirt portion 3.

Here, the melting point is defined as the temperature corresponding to the peak of a melt endothermic curve measured by means of the differential thermal analysis under the atmospheric pressure. On the other hand, the liquid-state flow starting point is defined as the temperature at which a resin starts liquid-state flow discharge from a nozzle having a diameter of 1 mm and a length of 10 mm when heated under a plunger pressure 160 kg/cm$^2$ and at a uniform rate, by employing a KOUKA type flow tester indicated in JIS (Japanese Industrial Standards) K6719.

In the case where the plastic stock 12 mainly consists of polyolefin, it is desirable that the polyolefin forming the cap 1 should be molecularly oriented, in order to prevent stress crack (apt to be caused by the stress generated in the cap by the internal pressure in case of hermetically sealing a container filled with, particularly, a positive internal-pressure type liquid such as carbonated beverages) from generating in the formed cap 1.

It is possible to obtain a molecularly oriented cap 1 in the case where the temperature of the material during molding is not higher than a temperature which is the melting point of the plastic concerned plus 40° C. Accordingly, in this case, molding is performed at a temperature not less than the melting point of the plastic concerned as well as not more than the melting point plus 40° C. In consequence, the temperature of the plastic stock 12 (the temperature thereof when it is supplied onto the lower plunger 6, or the temperature of the plastic stock 12 after it is thus supplied and heated by means of a heater) and the temperatures of each of the lower side surface portion $5a_1$ of the upper plunger, the upper end surface $6a$ of the lower plunger, the inner peripheral surface $8a$ of the holding pad 8 and the die cavity inner peripheral surface $7a_1$ and the like, are set so that the material of the plastic stock 12 is maintained within the above-mentioned temperature range during molding.

Further, it is desirable that the surfaces of the upper plunger 5, the lower plunger 6 and the die 7 contacting the material of the plastic stock 12 during molding are kept at a predetermined temperature for ensuring the stability of forming.

To this end, a cooler (not shown), and if necessary, a heater (not shown) is incorporated in each of the upper plunger 5, the lower plunger 6 and the die 7. However, if the temperature is high, much time is required for solidifying the cap by cooling after completion of molding, causing production rate to be lowered. Accordingly, it is desirable that the temperature be as low (e.g., 20° C.) as possible, using the cooler as long as the material during molding is maintained within the above-mentioned temperature range.

From the state shown in FIG. 3, while the disc body 12' is being compressed between the upper plunger 5 and the lower plunger 6, these plungers 5 and 6 are simultaneously introduced into the die cavity 7a (the introduction rate is generally 10–500 mm/sec.). In this case, in order to enable the above-mentioned compression (the compressive force is generally about 30–200 kg/cm$^2$), the lowering rates of the plungers are controlled by means of a drive control mechanism (e.g., hydraulic mechanism), not shown, so that the lowering rate of the upper plungers is larger than that of the lower plunger 6 and moreover the upper end surface 3'a of the sidewall portion 3' of the molded piece 1' is substantially brought into contact with a portion of the bottom surface 8b of the holding pad 8 corresponding thereto (see FIG. 4).

Figure 4:
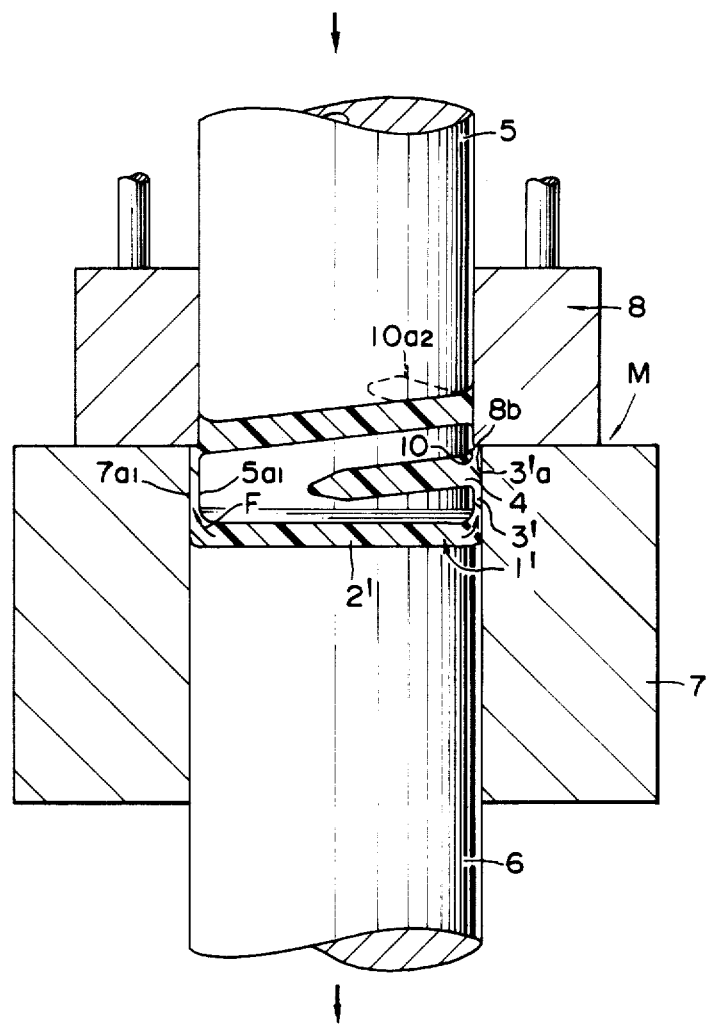

As shown in FIG. 4, the sidewall portion 3' is formed by the material flowing, by means of the above-mentioned compression, from the bottom wall portion 2' of the molded piece 1' to between the lower side surface portion 5a$_1$ of the upper plunger 5 and the die cavity inner peripheral surface 7a$_1$ in the direction of an arrow F.

At this time, the thread 4 is formed, while moving downwardly, on the portion of the molded piece 1' corresponding to the thread groove 10 of the upper plunger 5. It is to be noted that although the material also flows in the thread groove 10 positioned along the holding pad 8 up to a portion near the highest point 10a$_2$ during molding, since the height of the inner peripheral surface 8a of the holding pad 8 is set so as to be larger than the above-mentioned height h, there is no possibility that the material may escape to the outside, resulting in defectives having short of weight.

It is to be noted also that the air in the thread groove 10 escapes from between the sliding surfaces of the upper plunger 5 and the holding pad 8.

Figure 5:
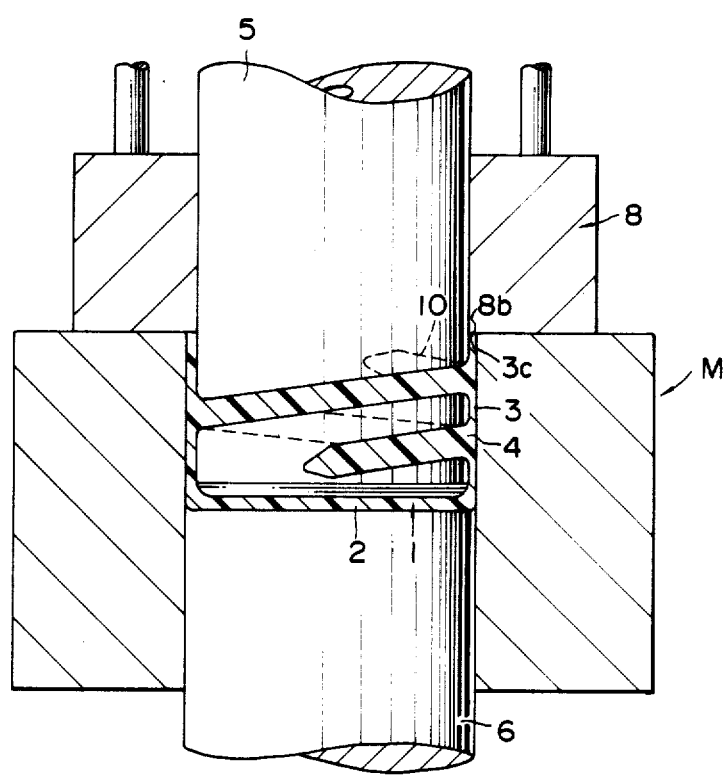

When the upper plunger 5 and the lower plunger 6 reach the bottom dead point, the cap 1 is formed having the top end 2 and the skirt portion 3 together with the thread 4 formed on the inner surface thereof, as shown in FIG. 5. The end surface 3c of the skirt portion 3 is defined by the lower surface 8b of the holding pad 8 as described above.

Figure 6:
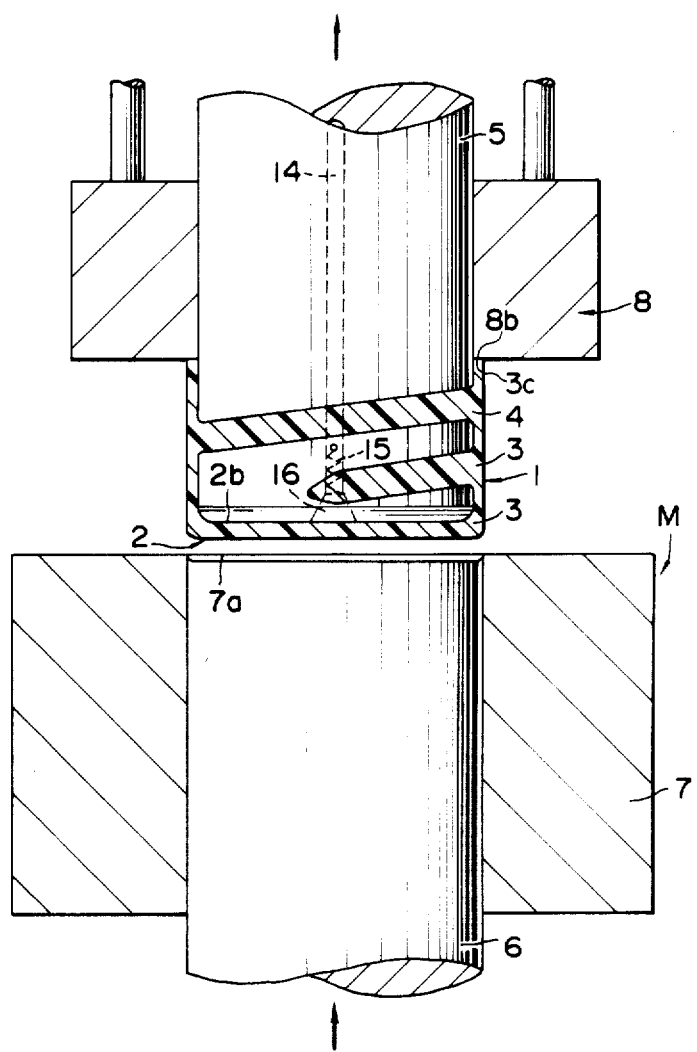

After the cap 1 has been cooled and solidified, as shown in FIG. 6, the upper plunger 5, the lower plunger 6 and the holding pad 8 are raised, and the cap 1 is removed from the die 7. Then, while a pressurized air is being sent from a pressurized-air source, not shown, to an air inlet bore 14 (having at its lower end a plug 16 normally brought into close contact with the truncated core-shaped lower end portion of the air inlet bore 14 by means of a spring 15) formed inside the upper plunger 5, only the upper plunger 5 is raised under the state where the end surface 3c of the skirt portion 3 is engaged by the bottom surface 8b of the fixed holding pad 8. Consequently, the skirt portion 3 is elastically expanded, and the cap 1 is removed from the upper plunger 5. Alternatively, the cap 1 may be removed from the upper plunger 5 by unscrewing the upper plunger 5 or the cap 1.

In the above example, the plastic stock 12 is introduced into the die cavity 7a by fixing the die 7 and compressing the plastic stock 12 between the upper plunger 5 and the lower plunger 6. However, the plastic stock 12 may be introduced into the die cavity 7a by fixing the lower plunger 6, lowering the upper plunger 5 and raising the die 7 while compressing the plastic stock 12 between the upper plunger 5 and the lower plunger 6. Moreover, the plastic stock 12 may be introduced into the die cavity 7a by fixing the upper plunger 5 and raising the lower plunger 6 and the die 7 while compressing the plastic stock 12 between the upper plunger 5 and the lower plunger 6. Furthermore, the plastic stock 12 may be introduced into the die cavity 7a by properly vertically moving the die 7, the upper plunger 5 and the lower plunger 6. These are true for the following examples.

Next, the manufacture of a pilfer-proof cap according to the invention will be described hereinunder.

Figure 7:
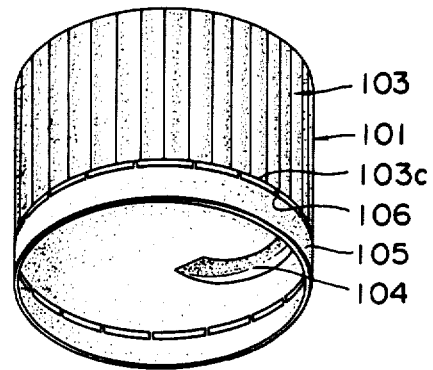
FIG. 7 is a perspective view of a pilfer-proof cap as a second example of the caps manufactured by the method of the invention.

FIG. 7 shows a heat-shrinkable pilfer-proof plastic cap 101. The end surface 103c of a skirt portion 103 is connected to a pilfer-proof band 105 in the shape of a short cylinder through a plurality of narrow bridges 106. After the cap 101 is screwed to the container mouth (not shown), the pilfer-proof band 105 surrounding the jaw of an annular land below the thread of the container mouth is shrunk on heating, thereby allowing the pilfer-proof band 105 to engage with the jaw.

Figure 8:
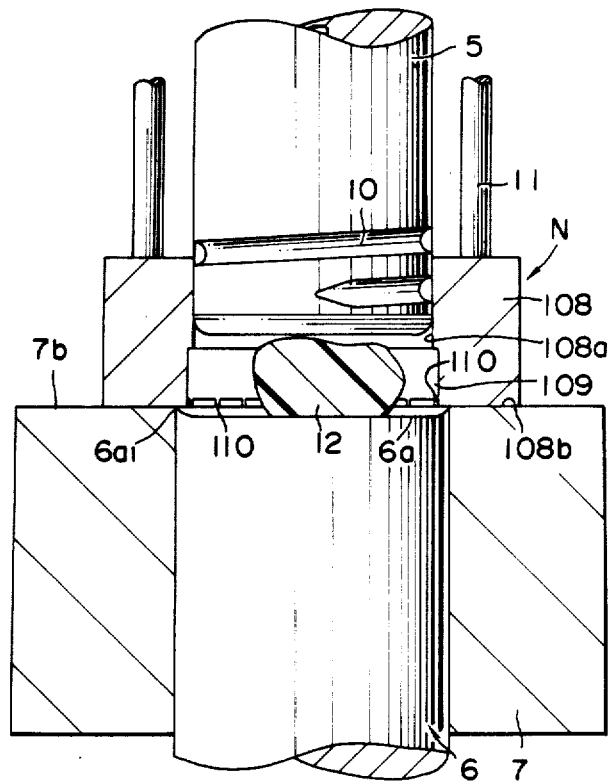
FIGS. 8 through 10 are sectional side elevations illustrating examples of processes of manufacturing the cap shown in FIG. 7, FIG. 8 illustrating the state where a plastic stock is loaded, FIG. 9 illustrating the state of molding in its early stage, FIG. 10 illustrating a state after completion of the molding.
Figure 9:
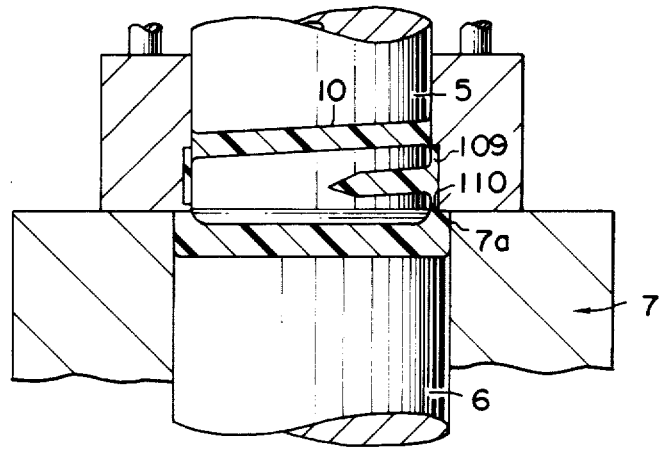
Figure 10:
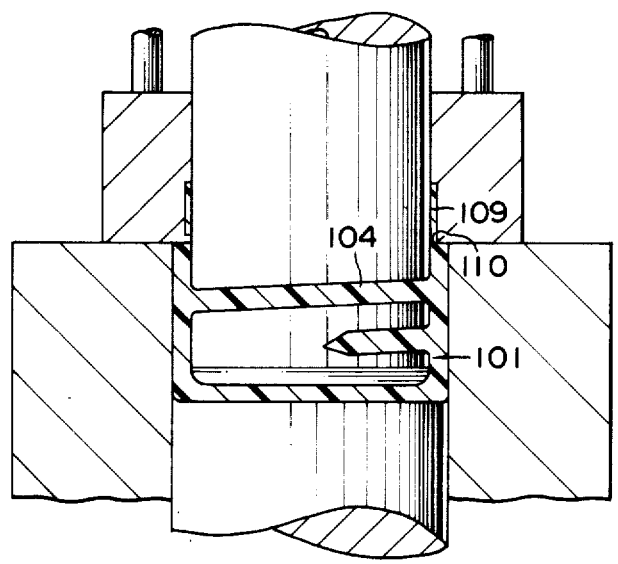

FIGS. 8 through 10 show essential portions of the processes and a molding apparatus N for manufacturing the pilfer-proof cap 101. Like reference numerals designate like portions or members in FIG. 3 and these Figures. The same is the case with infra FIG. 11.

The molding apparatus N is similar to the molding apparatus M shown in FIG. 3 except that a holding pad 108 has in the lower part of its inner surface 108a an annular groove 109 with a shape corresponding to that of the pilfer-proof band 105, together with a plurality of linear grooves 110 having a shape corresponding to that of the bridges 106 and extending from the lower end of the annular groove 109 to the lower surface 108b of the holding pad 108.

The method of manufacturing the cap 101 is also similar to that of the cap 1.

In this case, however, the upper end surface 6a of the lower plunger 6 is initially positioned as high as possible, preferably such that the side end 6a$_1$ reaches the level of the upper surface 7b of the die 7, as shown in FIG. 8.

After the plastic stock 12 is mounted on the lower plunger 6, the plastic stock 12 is compressed between the lowering upper plunger 5 and the lower plunger sustained in a stationary state, whereby the material of the plastic stock 12 fills substantially the annular groove 109 and the linear grooves 110.

Subsequently, the plastic stock 12 is introduced into the die cavity 7a, being compressed between the lowering upper plunger 5 and the lowering lower plunger 6. Consequently, in the early stage of the introduction, the material fills completely the linear grooves 110 and the annular groove 109 and the thread groove 10, as shown in FIG. 9. Since the above-mentioned filling of the material into the grooves takes place in the early stage of molding where the material has not so cooled down, there is no possibility that a defective pilfer-proof band 109 having a missing portion may be produced due to the fact that the annular groove 109 has an unfilled portion owing to the clogging of the narrow linear grooves 110 (the circumferential width is generaly 0.3–1.0 mm so that the bridges are easily broken in opening) with the solidified material, such as often met in the conventional compression molding process.

FIG. 10 shows the state where molding is completed and the cap 101 has been formed having a sound healthy pilfer-proof band 109 and sound bridges 110.

Figure 11:
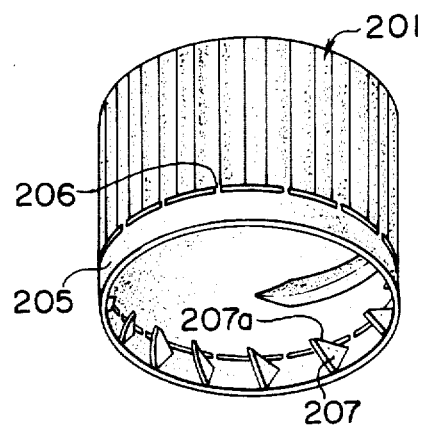
FIG. 11 is a perspective view of a conventional pilfer-proof cap having leaf-like projections.

A pilfer-proof cap 201 shown in FIG. 11 has a pilfer-proof band 205 and bridges 206 similarly to the cap 101, but differs therefrom in that a plurality of leaf-like projections 207 are formed on the inner surface of the pilfer-proof band 205. Each leaf-like projection 207 is usually triangular and has its upper end surface 207a disposed on a plane perpendicular to the axis thereof. The upper end surface 207a may be inclined to the plane.

When the container mouth (not shown) is sealed with the cap 201, the lower surface of the jaw on the container mouth and the upper end surface 207a of each leaf-like projection 207 engage with each other.

In case where this type of pilfer-proof cap is made, is used an upper plunger whose sidewall is formed with a plurality of recesses having a shape corresponding to that of the leaf-like projections, and the material of the plastic stock fills the recesses during molding to form the leaf-like projections. However, when the cap is removed from the upper plunger after the completion of the molding, the bridges are undesirably easily broken owing to the resistance of the leaf-like projections.

Therefore, it is difficult to make a satisfactory pilfer-proof cap 201, unless a complicated step is used, for example, a split-type upper plunger is used, or bridges are formed mechanically after molding without forming during molding.

Figure 12:
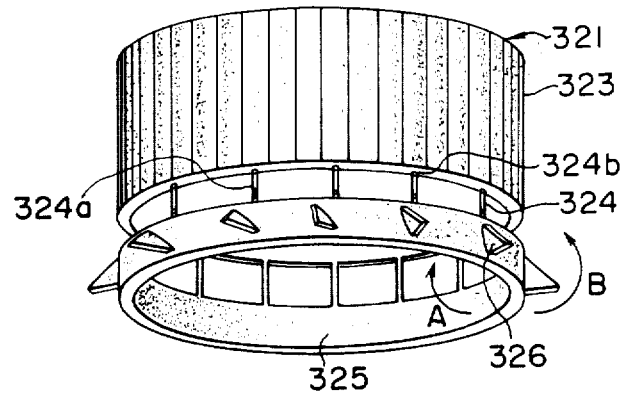
FIG. 12 is a perspective view of a third example of the cap manufactured by the method of the invention.

Hereinbelow will be described a method wherein the above problem is overcome. A cap 321, shown in FIG. 12 has a ring-shaped pilfer-proof band 325 which is connected to a skirt portion 323 through a plurality of long and slender bridges 324 (e.g., 4 mm (length)×1 mm×0.6 mm) downwardly extending from the lower end of the skirt portion 323 and each having thin weak portions 324a and 324b. The inside diameter of the pilfer-proof band 325 is substantially equal to that of the portion of the inner surface of the skirt portion 323 where no thread is formed. The height of the band 325 is substantially equal to or slightly larger than the height (e.g., 4 mm) of the bridges 324. The band 325 is formed with a plurality of leaf-like projections 326 on the outer surface thereof.

Figure 13:
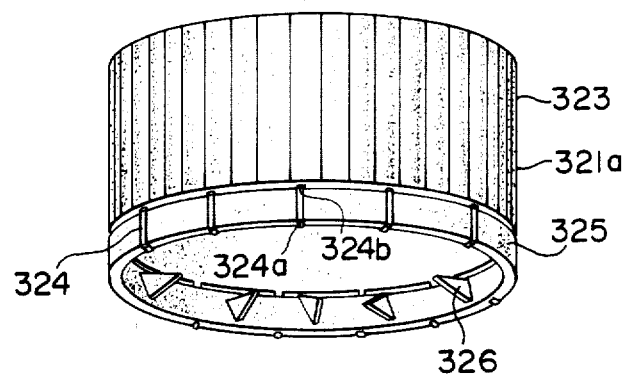
FIG. 13 is a perspective view of a pilfer-proof cap having the pilfer-proof band of the cap shown in FIG. 12 inverted toward inside the bridges thereof.
Figure 14:
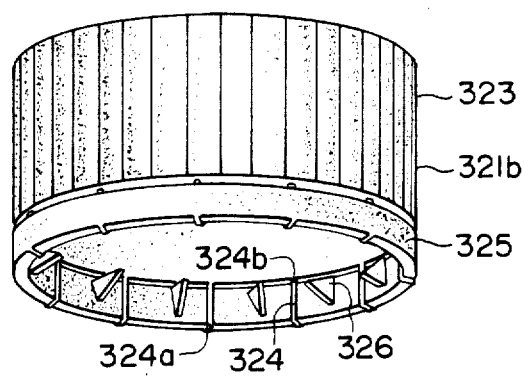
FIG. 14 is a perspective view of a pilfer-proof cap having the pilfer-proof band of the cap shown in FIG. 12 inverted toward outside the bridges thereof.

As shown in FIG. 13, the cap 321 can be formed into a pilfer-proof cap 321a having the leaf-like projections 326 disposed on the inner surface of the pilfer-proof band 325 by inverting the pilfer-proof band 325 in the direction of an arrow A, i.e., toward inside the bridges 324. In the similar manner, as shown in FIG. 14, the cap 321 can be formed into a pilfer-proof cap 321b having the leaf-like projections 326 disposed on the inner surface of the pilfer-proof band 325 by inverting the pilfer-proof band 325 in the direction of an arrow B, i.e., toward outside of the bridges 324.

In case of either the cap 321a or the cap 321b, when it is made to seal the container mouth (not shown), the leaf-like projections 326 engage with the outer surface of the annular land below the thread of the container mouth or the lower surface of the jaw (not shown) thereof. Therefore, there is no possibility that the pilfer-proof band may be raised together with the skirt portion 323 in opening, but the bridges 324 are cut at the thin weak portion 324b, thereby allowing the pilfer-proof properties to be ensured.

Figure 16:
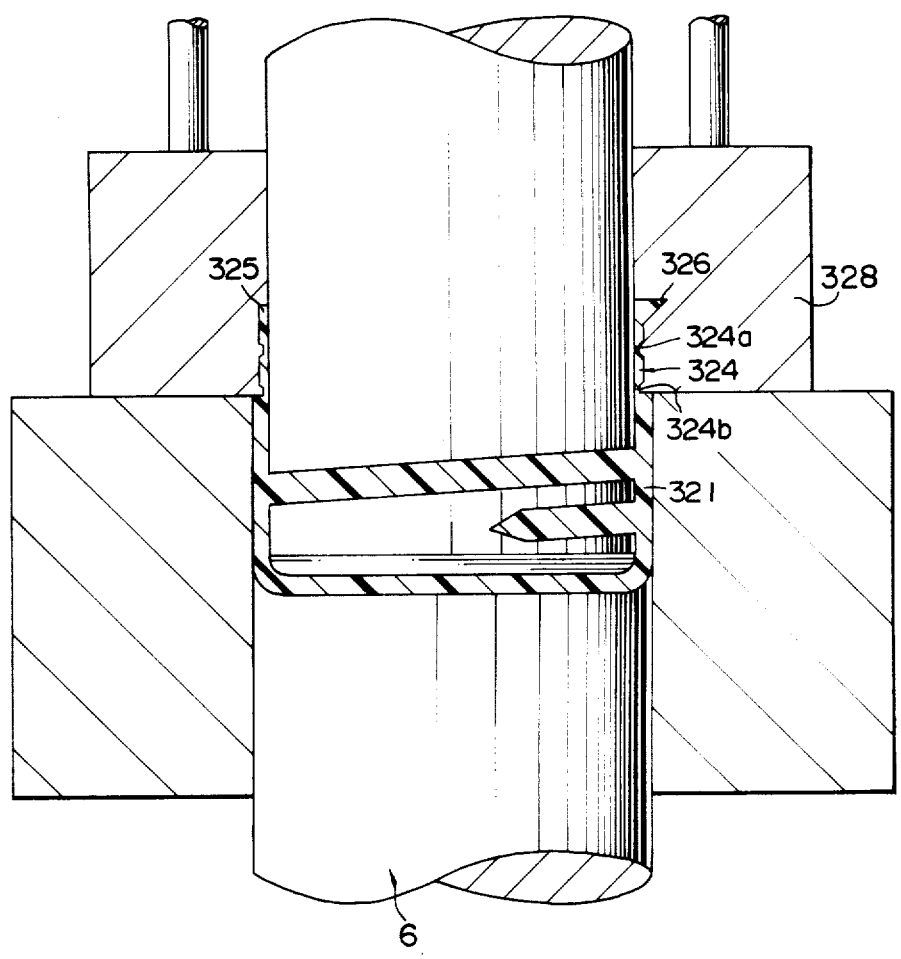

FIGS. 15 and 16 in combination show a method of forming the cap 321.

The holding pad 328 has grooves 334 with a shape corresponding to that of the bridges 324, small projections 334a, 334b with shapes corresponding to those of the thin weak portions 324a, 324b, respectively, and a groove 335 with a shape corresponding to that of the pilfer-proof band 325. Moreover, a plurality of recesses 336 with a shape corresponding to that of the leaf-like projections 326 are formed along the outer peripheral surface of the groove 335.

In a molding apparatus Q having the above construction, the cap 321 having the bridges 324, the thin weak portions 324a, 324b, the pilfer-proof band 325 and the leaf-like projections 326 can be formed in the same manner as that for manufacturing the cap 101, as shown in FIG. 16. In other words, under the state where the holding pad 328 is brought into contact with the upper surface of the die 7, the plastic stock 12 is introduced into the die cavity 7a, being compressed between the upper plunger 5 and the lower plunger 6.

The removal of the formed cap 321 can be easily effected without breaking the bridges 324, since, when the upper plunger 5 is raised, an inward relief for the pilfer-proof band 325 is provided, whereby the holding pad 328 can be raised without any damage to the leaf-like projections 326 and the bridges 324.

Figure 17:
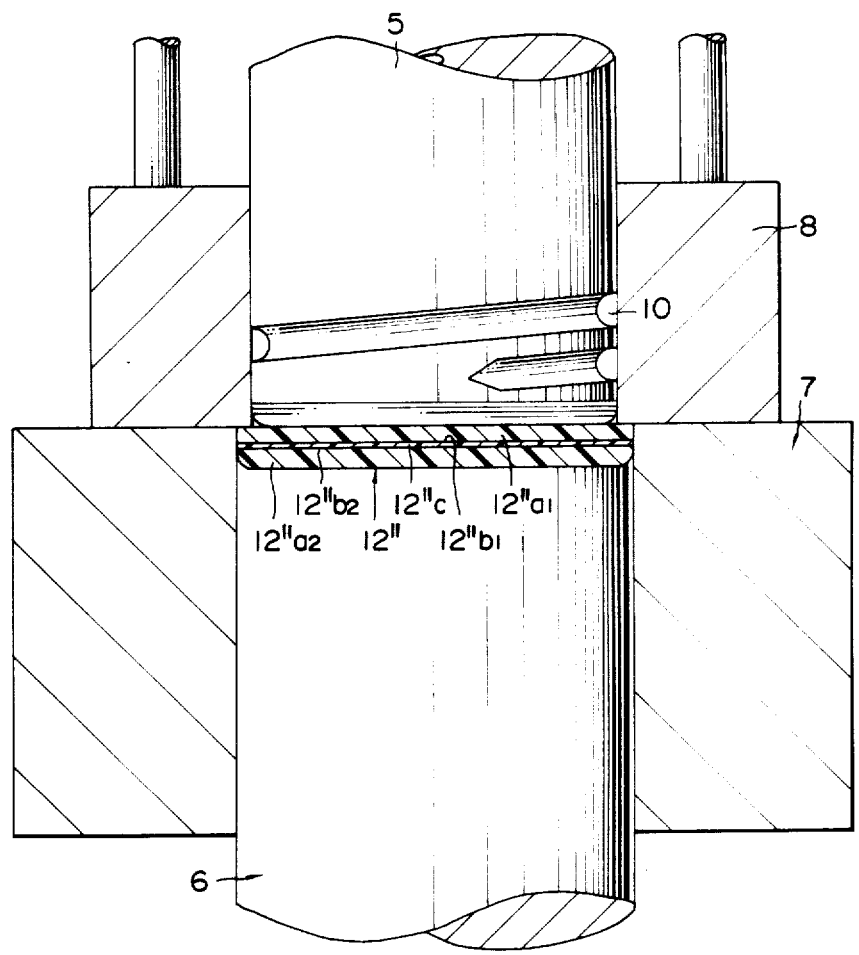
FIGS. 17 and 18 are sectional side elevations illustrating a state just before a cap is formed from a plastic stock of a laminate, and a state just after the completion of formation of the cap, respectively.
Figure 18:
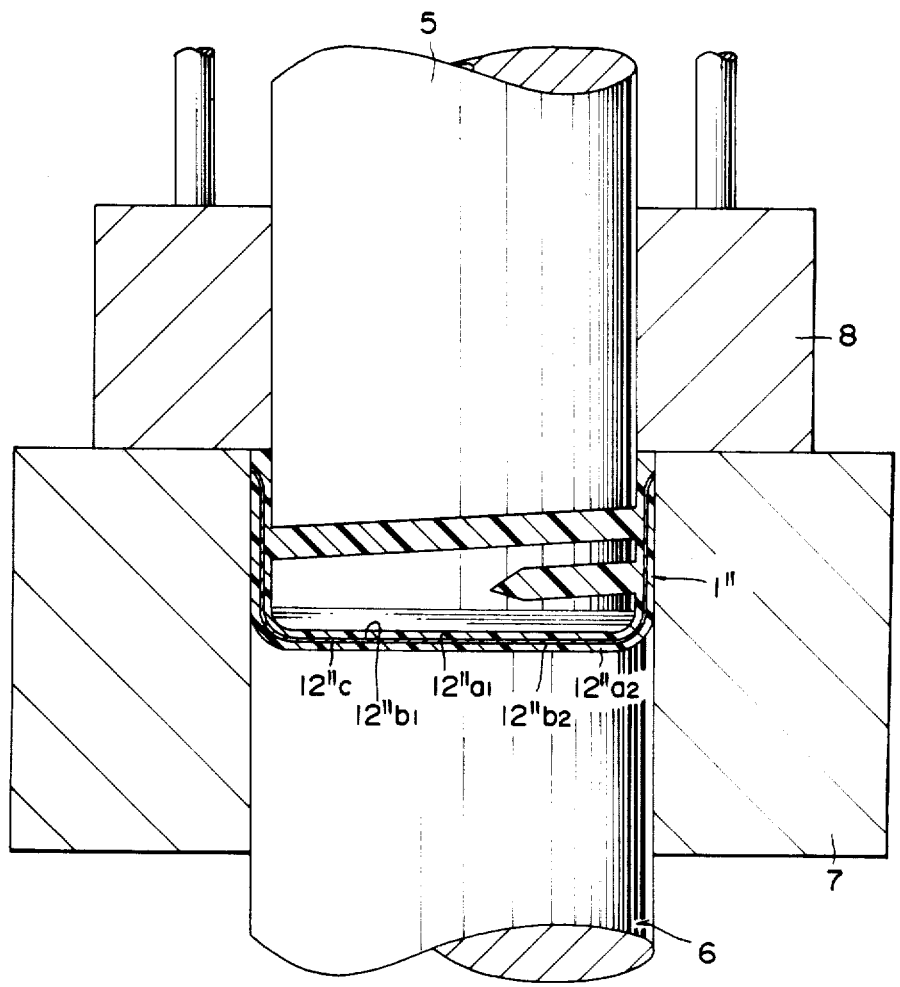

FIGS. 17 and 18 show an embodiment for making a cap 1″ having an improved gas barrier property, using a plastic stock 12″ formed from a laminate consisting of a polypropylene layer (A) 12″$a_1$, a maleic anhydride modified polypropylene layer (B: a bonding layer) 12″$b_1$, an ethylene vinyl-alcohol copolymer layer (C) 12″$c$, a maleic anhydride modified polypropylene layer (B) 12″$b_2$ and a polypropylene layer (A) 12″$a_2$, the thickness ratio of the layers A:B:C being 93:3:4.

FIGS. 19, 20 and 21 show an embodiment for making a cap 401 having a liner layer 408 formed integrally in the similar manner with the case of making the cap 1, except in that the plastic stock 12‴ is formed from a laminate consisting essentially of a low density polyethylene layer 12‴$a$ and a polypropylene layer 12‴$b$, the polyethylene layer 12‴$a$ facing the upper plunger 405, and the upper plunger 405 is formed with a recess 405a having a shape corresponding to that of the liner layer 408 on the bottom end surface thereof.

The polypropylene layer 12‴$b$ forms the cap 401, and the polyethylene layer 12‴$a$ forms the liner layer 408. It is preferable that the diameter of the plastic stock 12‴ is slightly smaller than the inner diameter of the recess 405a, and the volume of the polyethylene layer 12‴$a$ is not larger than that of the recess 405a.

Hereinbelow will be explained a practical example.

PRACTICAL EXAMPLE

As a material for the plastic stock 12 for making a plastic pilfer-proof cap 101 was employed isotactic polypropylene having a density (at 20° C) of 0.90 g/cm$^3$, a melting point (determined by the differential thermal analysis method) of 162° C., and a melt flow index (measured at 23° C. and under the load of 2160 g) of 0.31 g/10 min.

Figure 22:
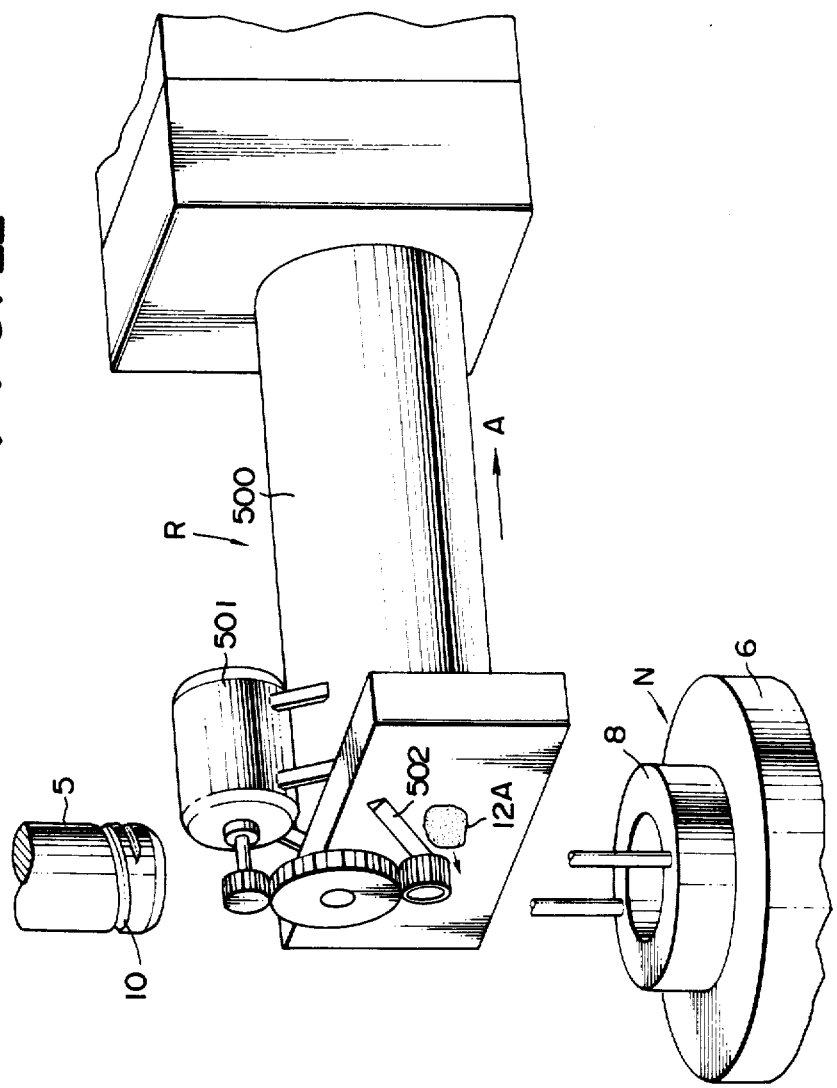
FIG. 22 is a perspective view illustrating an example of a system comprising a plastic stock supplying apparatus and a molding apparatus.

A portable extruder 500 as shown in FIG. 22 was used for supplying the plastic stock 12. The extruder 500 is incorporated with a full-flighted screw having the diameter of 40 mm and the effective length of 880 mm, and is provided with a rotary cutter 502 at the nozzle portion thereof.

The molding apparatus N of the type shown in FIG. was employed, wherein the diameter of the upper plunger was 28 mm, and the center line of the thread groove 10 starts at the position of 3.5 mm above the bottom end surface of the upper plunger 5, forming one and half turn with a pitch of 8 grooves per inch.

The height of the holding pad 108 was 10 mm, and the height and the depth of the annular groove 109 were 4 mm and 0.6 mm, respectively. The height, the depth and the width of the linear groove 110 were 1 mm, 0.6 mm and 0.5 mm, respectively. The inner surface of the die 7 was formed with knurls extending axially, and has the diameter of 30 mm measured along the apexes of the knurls.

So as to enable the molding according to the present invention and the conventional compression molding, the upper plunger 5, the lower plunger 6, the die 7 and the holding pad 108 are constructed to be driven or fixed independently or in a cooperating mode by means of a hydraulic circuit.

A system comprising the stock supplying apparatus R and the molding apparatus N is shown in FIG. 22. The molten resin 12A of 170° C. extruded from the nozzle portion of the portable extruder 500 was cut by a predetermined amount (2.58 g) by means of a rotary cutter 502 driven by a constant speed motor 501, and was allowed to drop onto the upper end surface 6a of the lower plunger 6, which is disposed as shown in FIG. 8 with respect to the die 7. Immediately after the dropping the stock supplying apparatus R was retracted in the direction of arrow A to the position where the molding was not hindered.

The surface temperatures of the die 7, the holding pad 108, the upper plunger 5 and the lower plunger 6 were set to 30° C.

The plastic stock 12 was placed onto the upper surface of the lower plunger 6 and pressed to fill the annular groove 109 and the linear grooves 110, between the lowering the upper plunger 5 and the lower plunger 6 at a standstill with the fixed die 7. Then the plastic stock 12 was introduced into the cavity 7a of the fixed die 7 with the lowering speed 50 mm/sec of the upper plunger 5 while compressed with a pressure of 130 Kg/cm$^2$. After the lower plunger 6 was lowered by 16 mm, the apparatus N was stopped, and caps 101A thus formed were removed from the upper plunger 5.

In the same manner as the above molding, except in that the lower plunger 6 was fixed, and the die 7 and the holding pad 108 were raised, caps 101B were made.

Caps 101C$_1$, 101C$_2$ and 101C$_3$ were made by the conventional compression molding as described hereinbelow.

The lower plunger 6, the die 7 and the holding pad 108 (whose surface temperatures were kept at 30° C.) were fixed such that the upper end surface 6a of the lower plunger 6 was disposed at the level lower by 16 mm than the bottom surface 108b of the holding pad 108, and the die 7 was in close contact with the holding pad 108. Immediately after a molten plastic stock (at 170° C.) of 2.58 g had been allowed to drop onto the upper end surface 6a of the lower plunger 6, the upper plunger 5 was lowered with a speed of 50 mm/sec and final compression pressures of 130 Kg/cm$^2$ (for the cap 101C$_1$), 200 Kg/cm$^2$ (for the cap 101C$_2$) and 250 Kg/cm$^2$ (for the cap 101C$_3$).

The shapes of the end portion 3c of the skirt, and the shapes as formed and the thermal shrinkages of the pilfer-proof band 105 of each caps were investigated, and the results are shown in Table 1.

With respect to the thermal shrinkage, the cut pilfer-proof bands were immersed in an oil bath of 140° C. for 10 seconds, and then the shrinkage ratio and the shapes after the shrinkage were evaluated.

TABLE 1

| Cap | | Shape of the end portion of the skirt | Pilfer-proof band | | |
|---|---|---|---|---|---|
| | | | Shape as formed | Shrinkage ratio (%) | Shape after Shrinkage |
| This invention | 101A | good | good | 5 | uniform |
| | 101B | good | good | 5 | uniform |
| Comparative examples | 101C$_1$ | poor[1] | poor[2] | — | — |
| | 101C$_2$ | poor[1] | poor[3] | — | — |
| | 101C$_3$ | good | poor[4] | 5 | — |

Note:
[1]The corner of the end portion is not filled.
[2]The pilfer-proof band was not formed. Bubbles in the top end 2.
[3]The pilfer-proof band was not formed.
[4]The pilfer-proof band was formed partially.

What is claimed is:

1. A method of manufacturing a plastic cap having a top end and a skirt portion hanging down from the peripheral edge of said top end, said skirt portion being provided with a thread formed on the inner surface thereof, comprising:

providing a first plunger whose lower side surface portion has a shape corresponding to the inner surface of said skirt portion and is formed with a thread groove with a shape corresponding to that of said thread and whose bottom end surface has a shape corresponding to that of the inner surface of said top end, a second plunger whose upper end surface has a shape corresponding to that of the outer surface of said top end, a holding pad with an inner peripheral surface with a height larger than that of said thread groove as well as an inside diameter substantially equal to the outside diameter of said first plunger, and a die provided with a die cavity having an inner peripheral surface with a shape corresponding to that of the outer peripheral surface of said skirt portion;

placing a molten plastic stock onto the upper end surface of said second plunger, said upper end surface being positioned at a level such that the volume of a die cavity gap portion above said upper end surface and below the level of said upper surface of said die is substantially equal to the volume of said molten plastic stock or less;

bringing the bottom surface of said holding pad into contact with the upper surface of said die; and introducing said first and second plungers into said die cavity with said first plunger sliding along the inner peripheral surface of said holding pad while compressing said molten plastic stock between said first and second plungers, whereby said skirt portion is formed by the material of said plastic stock flowing out from between said first and second plungers into between said lower side surface portion of said first plunger and said inner peripheral surface of said die cavity, while at an early stage of the forming, the end surface of said skirt portion is defined by a projecting portion of the bottom surface of said holding pad above said die cavity.

2. A method of manufacturing a plastic cap having a top end, a skirt portion hanging down from the peripheral edge of said top end, and a pilfer-proof band having a shape of a short cylinder, said skirt portion being provided with a thread formed on the inner surface thereof, and said pilfer-proof band being connected to the end surface of said skirt portion through a plurality of narrow bridges, comprising:

providing a first plunger whose lower side surface portion has a shape corresponding to the inner surface of said skirt portion and is formed with a thread groove with a shape corresponding to that of said thread and whose bottom end surface has a shape corresponding to that of the inner surface of said top end, a second plunger whose upper end surface has a shape corresponding to that of the outer surface of said top end, a holding pad with an inner peripheral surface with a height larger than that of said thread groove, the upper portion of said inner peripheral portion having an inside diameter substantially equal to the outside diameter of said first plunger, and the lower portion of said inner peripheral portion being formed with a plurality of linear grooves having an inside diameter substantially equal to the outside diameter of said first plunger, and the lower portion of said inner peripheral portion being formed with a plurality of linear grooves having a shape corresponding to said bridge on the lower end thereof, and an annular groove connecting to said linear grooves and having a shape corresponding to said pilfer-proof band, and a die provided with a die cavity having an inner peripheral surface with a shape corresponding to that of the outer peripheral surface of said skirt portion;

placing a molten plastic stock onto the upper end surface of said second plunger disposed in proximity of the level of the bottom end surface of said holding pad;

bringing said holding pad into contact with the upper surface of said die;

compressing said molten plastic stock between said first and second plungers to form said pilfer-proof band and said bridges between said first plunger and said holding pad; and then introducing said first and second plungers into said die cavity with said first plunger sliding along the upper portion of the inner peripheral surface of said holding pad while compressing said molten plastic stock between said first and second plungers, whereby said skirt portion is formed by the material of said plastic stock flowing out from between said first and second plungers into between said lower side surface portion of said first plunger and said inner peripheral surface of said die cavity, while at an early stage of the forming, said pilfer-proof band and said narrow bridges are defined by said annular groove and said linear grooves, respectively.

3. A method of manufacturing a plastic cap having a top end, a skirt portion hanging down from the peripheral edge of said top end, and a pilfer-proof band having a shape of a short cylinder, said skirt portion being provided with a thread formed on the inner surface thereof, and said pilfer-proof band being connected to the end surface of said skirt portion through a plurality of narrow bridges, and being formed with a plurality of leaf-like projections on the outer surface thereof, comprising:

providing first plunger whose lower side surface portion has a shape corresponding to the inner surface of said skirt portion and is formed with a thread groove with a shape corresponding to that of said thread and whose bottom end surface has a shape corresponding to that of the inner surface of said top end, a second plunger whose upper end surface has a shape corresponding to that of the outer surface of said top end, a holding pad with an inner peripheral surface with a height larger than that of said thread grove, the upper portion of said inner peripheral portion having an inside diameter substantially equal to the outside diameter of said first plunger, and the lower portion of said innner peripheral portion being formed with a plurality of linear grooves having a shape corresponding to said bridge on the lower end thereof, and an annular groove connecting to said linear grooves, and having a shape corresponding to said pilfer-proof band with said leaf-like projections, and a die provided with a die cavity having an inner peripheral surface with a shape corresponding to that of the outer peripheral surface of said skirt portion;

placing a molten plastic stock onto the upper end surface of said second plunger disposed in proximity of the level of the bottom end surface of said holding pad;

bringing said holding pad into contact with the upper surface of said die;

comprissing said molten plastic stock between said first and second plungers to form said pilfer-proof band and said bridges between said first plunger and said holding pad; and then introducing said first and second plungers into said die cavity with said first plunger sliding along the upper portion of the inner peripheral surface of said holding pad while compressing said molten plastic stock between said first and second plungers, whereby said skirt portion is formed by the material of said plastic stock flowing out from between said first and second plungers into between said lower side surface portion of said first plunger and said inner peripherial surface of said die cavity, while at an early stage of the forming, said pilfer-proof band and said narrow bridges are defined by said annular groove and said linear grooves, respectively.

4. A method as claimed in claim 3, which further comprises inverting said pilfer-proof band toward inside said bridges so that said leaf-like projections be positioned inside said pilfer-proof band.

5. A method as claimed in claim 3, which further comprises inverting said pilfer-proof band toward outside said bridges so that said leaf-like projections be positioned inside said pilfer-proof band.

6. A method as claimed in claim 1, 2 or 3 wherein said die is fixed, and said first and said second plungers are introduced into said die cavity such that the bottom end surface of said first plunger and the upper end surface of said second plunger move apart from said upper surface of said die.

7. A method as claimed in claim 1, 2 or 3 wherein said second plunger is fixed, and said first and second plungers are introduced into said die cavity such that the upper surface of said die moves apart from the bottom end surface of said first plunger and the upper end surface of said second plunger.

8. A method as claimed in claim 1, 2 or 3 wherein said first plunger is fixed; and said first and second plungers are introduced into said die cavity such that the upper surface of said die moves apart from the bottom end surface of said first plunger and the upper end surface of said second plunger.

9. A method as claimed in claim 1, 2 or 3 wherein said plastic stock is constituted of polyolefin.

10. A method as claimed in claim 1, 2 or 3 wherein said plastic stock is formed from a laminate comprising polyolefin and ethylene-vinyl alcohol copolymer.

11. A method as claimed in claim 1, 2 or 3 wherein the temperature of said plastic stock is kept during molding between the melting point of said polyolefin and said melting point plus 40° C.

12. A method as claimed in claim 1, 2 or 3 wherein said cap is formed integrally with a liner layer, said plastic stock is formed from a laminate consisting essentially of a relatively soft plastic layer to be formed into said liner layer, and a relatively hard plastic layer, the bottom end surface of said first plunger is formed with a recess having a shape corresponding to said liner layer, and said plastic stock is compressed with said relatively soft plastic layer facing the bottom end of said first plunger to form said liner layer in said recess.

13. A method as claimed in claim 9 wherein said polyolefin has a melt flow index of O.3 to 10 gram/minute.

* * * * *

UNITED STATES PATENT AND TRADEMARK OFFICE
CERTIFICATE OF CORRECTION

PATENT NO. : 4,649,013
DATED : March 10, 1987
INVENTOR(S) : OSAMU YAMAMOTO ET AL It is certified that error appears in the above-identified patent and that said Letters Patent is hereby corrected as shown below:

On the cover page, Item [73], change "Osaka" to

--- Tokyo ---.

Signed and Sealed this

Twenty-eighth Day of June, 1988

Attest:

DONALD J. QUIGG

*Attesting Officer*     *Commissioner of Patents and Trademarks*